(12) United States Patent
Wehmeier et al.

(10) Patent No.: US 8,186,205 B2
(45) Date of Patent: May 29, 2012

(54) PROCEDURE AND DEVICE FOR DIAGNOSING THE DYNAMIC OF AN EXHAUST GAS SENSOR

(75) Inventors: Kersten Wehmeier, Ludwigsburg (DE); Ronaldi Rusli, Korntal-Muenchingen (DE); Andreas Koring, Reutlingen (DE); Richard Hotzel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 12/421,370

(22) Filed: Apr. 9, 2009

(65) Prior Publication Data

US 2009/0260429 A1  Oct. 22, 2009

(30) Foreign Application Priority Data

Apr. 16, 2008  (DE) .................. 10 2008 001 213

(51) Int. Cl.
*G01M 15/10* (2006.01)
(52) U.S. Cl. .................................................. 73/114.69
(58) Field of Classification Search ............... 73/114.69, 73/114.71, 114.72, 114.73, 114.75, 114.77
See application file for complete search history.

(56) References Cited

U.S. PATENT DOCUMENTS

| | | | | |
|---|---|---|---|---|
| 5,513,522 A * | 5/1996 | Seki et al. | ................. | 73/114.71 |
| 6,422,000 B1 * | 7/2002 | Poggio et al. | ................. | 60/274 |
| 7,461,536 B2 * | 12/2008 | Schnaibel et al. | ............. | 73/1.06 |
| 7,797,930 B2 * | 9/2010 | Kusatsugu | ...................... | 60/297 |
| 7,913,550 B2 * | 3/2011 | Schoenthaler et al. | .... | 73/114.69 |
| 2004/0000493 A1 * | 1/2004 | Yasui et al. | .................... | 205/775 |
| 2004/0010364 A1 * | 1/2004 | Yasui et al. | .................... | 701/114 |
| 2004/0094138 A1 * | 5/2004 | Yasui et al. | .................... | 123/688 |
| 2007/0010932 A1 * | 1/2007 | Gotoh et al. | .................. | 701/114 |
| 2008/0306673 A1 * | 12/2008 | Yasui et al. | .................... | 701/102 |
| 2009/0151437 A1 * | 6/2009 | Saunders | .................. | 73/114.73 |

FOREIGN PATENT DOCUMENTS

DE        102 60 721        7/2004

* cited by examiner

*Primary Examiner* — Eric S McCall
(74) *Attorney, Agent, or Firm* — Merchant & Gould P.C.

(57) ABSTRACT

The invention concerns a procedure and a device for diagnosing the dynamic of an exhaust gas sensor, which is arranged in an exhaust gas duct of a combustion engine and with which a parameter of the gas mixture that is supplied to the combustion engine is regulated by a control loop. It is thereby provided according to the invention that during a diagnosing period a temporal deflection of a regulation correcting variable for the parameter that is derived from an output signal of the exhaust gas sensor or a temporal course of the output signal of the exhaust gas sensor is used for the diagnosis and that the dynamic of the exhaust gas sensor is assumed in an evaluation algorithm. Thereby an improvement of the on-board diagnosis of the dynamic of the exhaust gas sensor can be achieved and in particular lambda probes, which provide a slowing down of their responding behavior, can be detected early on.

13 Claims, 1 Drawing Sheet

PROCEDURE AND DEVICE FOR DIAGNOSING THE DYNAMIC OF AN EXHAUST GAS SENSOR

TECHNICAL FIELD

The invention concerns a procedure and a device for diagnosing the dynamic of an exhaust gas sensor, which is arranged in an exhaust gas duct of a combustion engine and with which a parameter of the mixture that is supplied to the combustion engine is regulated by a control loop.

BACKGROUND

A lambda regulation in connection with a catalyzer is nowadays the most efficient exhaust gas purification system for the Otto engine. Only together with nowadays available ignition- and injection systems very low exhaust gas values can be achieved.

Particularly efficient is the use of a three-way or selective-catalyzer. That catalyzer has the feature to reduce hydrocarbons, carbon monoxide and nitrous gases up to more than 98%, if the engine is operated in a range of approximately 1% around the stoichiometric air fuel relation with $\lambda=1$. The lambda value provides thereby how far the actually present air fuel mixture deviates from the value $\lambda=1$, which is equivalent to a mass relation of 14.7 kg air to 1 kg benzene that is theoretically necessary for a complete combustion, which means that the lambda value is the quotient of the supplied air mass and theoretical air demand. At an air surplus $\lambda$ is $>1$ (lean mixture). At a fuel surplus $\lambda$ is $<1$ (rich mixture).

Each exhaust gas is basically measured at a lambda regulation and the supplied fuel amount is instantly corrected according to the measuring result for example with the aid of an injection system.

As a sensor element lambda probes are used, which can be construed on the hand as so-called two-point lambda probe or snap probe and on the other hand as constant lambda probe or wideband lambda probe. The effect of these lambda probes is based on the familiar principle of a galvanic oxygen concentration cell with a solid electrolyte. The characteristic line of a two-point lambda probe provides a jerky drop o the probe voltage at $\lambda$–1. Therefore a two-point lambda probe, which is usually directly attached behind the exhaust gas manifold, enables basically only the distinction between rich and lean exhaust gas. Both lambda probe types consist of a ceramic sensor element, a protection pipe and as cables, a plug and the connections between those elements. The protection pipe consists of one or several metal cylinders with openings. Through these openings exhaust gas enters by diffusion or convection and gets to the sensor element. The sensor elements of the two lambda probe types are therefore construed differently.

Significant for the low-emission operation of the combustion engine is a quick regulation of the exhaust gas composition on to the preset lambda value. This applies in particular also to combustion engines with a single cylinder regulation, at which the air-fuel mixture is adjusted individually for each single cylinder of the combustion engine on the basis of the signal of the common lambda probe. Therefore the lambda measurement has to take place with a high temporal resolution in order to determine the consecutive exhaust gas volumes of the different cylinders in its composition that get to the lambda probe and to be able to assign them to a corresponding cylinder.

Besides the selected regulation parameters of the lambda control loops and the distance parameters the dynamic of the lambda probe determines the speed of the control loop. The dynamic of the lambda probes in mint condition is thereby also sufficient for a single cylinder regulation with one lambda probe in a common exhaust gas duct for all cylinders. Due to ageing effects the dynamic characteristics of the lambda probes can be changed in such a way that the temporal resolution of the determination of the exhaust gas composition is not sufficient anymore, which causes an increased oxygen emission. If that is located outside the statutory provisions the lacking dynamic of the lambda probe has to be determined in the range of the on-board diagnosis of the combustion engine and a corresponding error message has to be provided. In several countries the statutory provisions for motor vehicles require that such a diagnosis has to be implemented in engine control units, which turns on an error light when the lambda probe slows down, which causes an exceeding of a determined pollution threshold value. In the USA the dynamic parameter that has to be monitored is précised as the so-called response-time, which means the time between a change of the oxygen or rich gas concentration in the exhaust gas at the probe and the corresponding change of the probe signal.

The state of the art knows a number of diagnosis procedures, for example the comparison of a measured and an expected lambda signal at a familiar stimulus.

The application DE 102 60 721 A1 describes for example a procedure for diagnosing the dynamic features of a lambda probe, which is used at least temporally for a cylinder individual lambda regulation, as well as an associated diagnosis device. It is thereby provided that at least one correcting variable of the lambda regulation is detected and compared to a default maximum threshold and in the case of an exceeding of the maximum threshold the dynamic behavior of the lambda probe is evaluated as not sufficient with regard to the operational capability for the cylinder individual lambda regulation. The dynamic features of the lambda probe can be detected from the single cylinder regulation itself because the cylinder individual regulators do not diverge at an insufficient dynamic of the lambda probe. Furthermore the test function can provided with an aimed disorder or alienation of the actual lambda value. The procedure is therefore suitable for combustion engines with a single cylinder lambda regulation or it requires an aimed influencing of the lambda value.

But several procedures have the disadvantage that only a change of the temporal constant of the lambda probe but nit a pure dead time in the probe signal can be detected. It is for example not possible to detect a dead time at a comparison between measured and expected lambda signal at a periodical stimulus because there is no possibility to decide whether an observed reaction in the measured lambda signal is based on the stimulus of the directly preliminary period or an earlier period.

It is therefore the task of the invention to provide a procedure, which enables a reliable and improved on-board diagnosis of the dynamic of an exhaust gas sensor. It is furthermore the task of the invention to provide a corresponding device.

SUMMARY

The task of the invention that concerns the procedure is thereby solved, in that a temporal deflection of a regulation correcting variable for the parameter that has been derived from an output signal of the exhaust gas sensor or a temporal course of the output signal of the exhaust gas sensor is used during a diagnosis period for the diagnosis and that the dynamic of the exhaust gas sensor is assumed in an evaluation algorithm. With the diagnosis procedure erroneous exhaust gas sensors can be detected and displayed in the range of the on-board diagnosis regarding the dynamic, whereby in particular the strict statutory provisions in the USA regarding the detection of an erroneous response-time of an exhaust gas sensor can be complied.

It is thereby in particular provided that with regard to the diagnosis of an error of the exhaust gas sensor a temporal change of the regulation correcting variable or the output signal of the exhaust gas sensor with regard to the achieving of very high or very low deflections for a certain time are evaluated. Such a signal behavior has proven to be characteristically for an exhaust gas sensor, which provides a high dead time. The regulation correcting variable shows a typical oscillation behavior, in which the regulation correcting variable goes alternately into an upper or lower stop and stays there typically for a time, which is equivalent to the dead time. If such a oscillation behavior can be detected an exhaust gas sensor with an extremely long dead time can be assumed.

For evaluating such a oscillation pattern an evaluation algorithm has proven to be advantageous with regard to its implementation, at which time periods with a minimum duration, the passing through of maximum values and/or the passing though of minimum values are detected for the regulation correcting variable or for the output signal of the exhaust gas sensor and their amount during a release condition is stored in counters C0, C1 or C2.

With regard to an error-free detection of maximum or minimum values it can be provided that a maximum value or a minimum value of the regulation correcting variable or the output signal of the exhaust gas sensor is detected, if an upper threshold value is exceeded or a lower threshold value is fallen short of.

With regard to the detection of an erroneous, dynamic reduced exhaust gas sensor it can be additionally beneficial if the maximum values or minimum values of the regulation correcting variable or the exhaust gas signal of the exhaust gas sensor is only counted, if they occur alternately. This indicates then a typical oscillation behavior of an erroneous exhaust gas sensor.

An erroneous exhaust gas sensor is then detected, if the counter stands of the counter C1 values for the maximum values and/or the counter C2 for the minimum values achieve certain threshold, before certain counter stands are achieved in the counter C0.

An alternative evaluation algorithm can also be construed in such a way that a product is created from the regulating correcting variable that has been derived from the output signal of the exhaust gas sensor and another variable, which is derived by using a calculation operation from the output signal of the exhaust gas sensor and in that the temporal course of this product is evaluated with regard to exceeding certain threshold values. The other variable can for example be a linear or constant function for example the average value of the temporal deflection of the regulation correcting variable. If the area that is created by the product creation exceeds a certain amount after a certain time an error can be derived thereof for example.

Thereby it can also be advantageous, if on the temporal course of the product a filter function is used, for example in the form of a low pass filter. A low pass filter damps thereby higher frequent signals more so that short disturbance signals such as interference peaks are suppressed, so that the occurrence of erroneous diagnosis results is reduced.

On the other hand the application of a high pass filter function on the regulation correcting variable before the connection with the other variable can be advantageous in such a way that slow offsets do not disturb the evaluation algorithm.

It is typical for combustion engine operated with benzene, if the exhaust gas sensor is a lambda probe in the form of a two-point lambda probe or a wideband lambda probe and that the temporal course of a lambda values is evaluated as output signal.

If the exhaust gas sensor is a NOx-sensor and if the temporal course of a NOx-concentration in the exhaust gas of the combustion engine is evaluated, the previously described procedure variants can also be used at a diesel combustion engine, at which the parameter is the amount of a certain remaining gas in the gas mixture.

If the error is signalized to the operator of the combustion engine after detecting an erroneous exhaust gas sensor and/or registered in an error storage, the registration in an error storage can be read when visiting an auto shop and thereupon the erroneous exhaust gas sensor can be exchanged.

A preferred application of the previously described procedure provides the use at combustion engines with multi bank exhaust gas systems, in which the exhaust gas of different cylinder groups is delivered in separated exhaust gas ducts, in which each at least one exhaust gas sensor is arranged.

The task that concerns the device is thereby solved, in that in a diagnosis device a temporal deflection of a regulation correcting variable that is derived from an output signal of the exhaust gas sensor for the parameter during a diagnosis period or a temporal course of the output signal of the exhaust gas sensor can be evaluated for the diagnosis during a diagnosis period and that with the aid of an evaluation algorithm the dynamic of the exhaust gas sensor can be assumed. The diagnosis device can thereby be a part of a superior engine control.

BRIEF DESCRIPTION OF THE DRAWINGS

The invention is further explained in the following with the aid of the embodiment that is illustrated in the figures. It is shown in.

DETAILED DESCRIPTION

Figure 1:
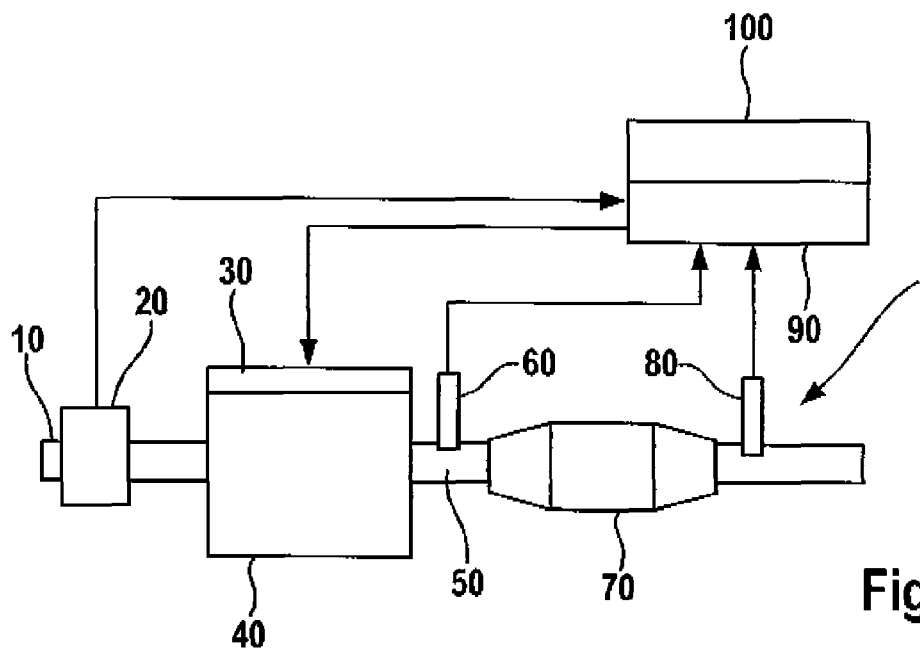
FIG. 1 shows schematically an illustration of a combustion engine with a control loop for a lambda regulation.

FIG. 1 shows exemplarily a technical surrounding, in which the procedure according to the invention can be used. The illustration is thereby limited to the components that are required for the explanation of the invention.

In the figure there is a combustion engine 1, consisting of an engine block 40 and an supply air duct 10, which supplies the engine block 40 with combustion air, whereby the air volume in the supply air duct 10 can be determined by an supply air measuring device 20. The exhaust gas of the combustion engine 1 is thereby delivered over an exhaust gas purification system, which provides an exhaust gas duct 50 as its main component, in which a first exhaust gas sensor 60 is arranged in the direction of the current of the exhaust gas before a catalyzer 70 and if necessary a second exhaust gas sensor 80 behind the catalyzer 70.

The exhaust gas sensors 60, 80 are connected with a control unit 90, which calculates the mixture from the data of the exhaust gas sensors 60, 80 and the data of the supply air measuring device 20 and controls a fuel metering device 30 for metering fuel. Coupled with the control unit 90 or integrated into it a diagnosis unit 100 is provided, with which the signals of the exhaust gas sensors 60, 80 can be evaluated. The diagnosis unit 100 can furthermore be connected with a display/storage unit, which is here not further illustrated.

With the exhaust gas sensor 60 that is arranged in the exhaust gas duct 50 behind the engine block 40 a lambda value can be adjusted with the aid of the control unit 90, which is suitable for the exhaust gas purification system for achieving am optimal purification effect. The second exhaust gas sensor 80 that is arranged in the exhaust gas duct 50 behind the catalyzer 70 can also be evaluated in the control unit 90 and serves for determining the oxygen storage capacity of the exhaust gas purification system in a procedure according to the state of the art.

Exemplarily a combustion engine 1 is here shown, which provides only one exhaust gas duct 50. But the procedure according to the invention applies also to combustion engines 1 with multi bank exhaust gas systems, in which the cylinders are comprised in several groups and the exhaust gas of the different cylinder groups is delivered in separated exhaust gas ducts 50, in which each at least one exhaust gas sensor is arranged.

The procedure also applies to the case that regarding the exhaust gas flow upstream or downstream of the considered exhaust gas sensor 60 further exhaust gas sensors, for example as it is shown in FIG. 1, the exhaust gas sensor 80 are arranged. But principally the procedure aims at the first lambda probe in streaming direction behind the outlet valves in the combustion engine 1 that are used for the lambda regulation.

Figure 2:
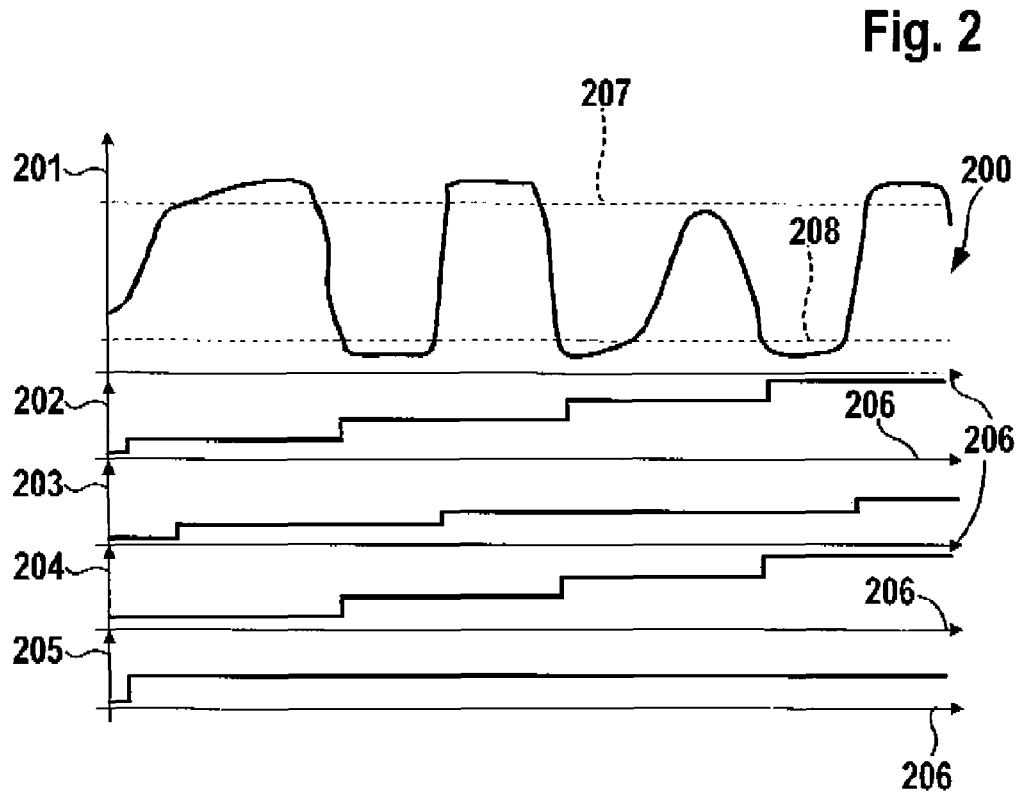
FIG. 2 shows an evaluation algorithm in the form of time courses of different parameters.

FIG. 2 shows exemplarily an evaluation algorithm 200 for the procedure, in which during a diagnosing period a temporal deflection of a regulation correcting variable 201 for the parameter that has been derived from the output signal of the exhaust gas sensor is evaluated for the diagnosis and that the dynamic of the exhaust gas sensor 60 is assumed in the evaluation algorithm 200. The described procedure variant provides thereby that regarding the diagnosis of an error of the exhaust gas sensor 60 a temporal change of the regulation correcting variable 201 is evaluated for a certain time.

The diagnosis procedure takes advantage of the fact that a too slow exhaust gas sensor 60, in that case a too lambda probe, causes instabilities, in particular oscillations of the lambda regulation, because it is construed for certain distance dynamics, which contains the dynamic of a error-free lambda probe. It is independent of whether the slowing down exists in an increasing of the lambda probe time constant or in a dead time. In the case of a dead time, which is very high compared to the regulator speed, the regulator position interference or the regulation correcting variable 201 shows a characteristic form. It goes alternately at the upper and lower end stop and stays there for a time, which is approximately the same as the dead time.

This characteristic form is detected according to the invention by an evaluation algorithm 200, which a counter C0 202 counts time periods or a certain minimum duration, during which the release condition 205 is fulfilled, and further counters C1 and C2 203, 204 count events, in which the regulation correcting variable 201 exceeds a certain upper threshold value 207 or falls short of a certain lower threshold value 208, whereby it is only counted, if the two events occur alternately. An error is recognized, if the counter C1 203 and the counter C2 204 reach certain values, before the counter C0 202 reaches another certain threshold value. The different values are shown in FIG. 2 for the evaluation algorithm 200 depending on the time 206.

Alternatively an algorithm is possible, which measures the area between the regulation correcting variable 201 and the average value of the regulation correcting variable 201 or between the lambda signal and the average value of the lambda signal and divides it by the integration time.

Further variant provide instead of a division of the previously created integral by the integration time a calculation of a signal by filtering the integral by a low pass.

It can furthermore be provided that the integral is set to the value 0, if the release condition 205 is not fulfilled. Only coherent signal courses are then used for the diagnosis.

With the diagnosis procedure erroneous exhaust gas sensors 60 in the range of the on-board diagnosis can be detected and displayed with regard to the dynamic, whereby in particular the statutory provisions in the USA regarding the detection of an erroneous response-time of an exhaust gas sensor can be fulfilled.

The invention claimed is:

1. A method of diagnosing an operation of an exhaust gas sensor that is arranged in an exhaust gas duct of a combustion engine, wherein the exhaust gas sensor controls through a control loop a parameter of a gas mixture that is supplied to the combustion engine, the method comprising:
   during a diagnosing period, using a displacement over time of a correcting variable for the parameter that is derived from an output signal of the exhaust gas sensor, or a course over time of the output signal of the exhaust gas sensor for the diagnosis;
   determining an operating state of the exhaust gas sensor in an evaluation algorithm based on the output signal of the exhaust gas sensor; and
   upon implementation of the evaluation algorithm, at least one of detected time periods with a minimum length, detected amounts of maximum values, and detected amounts of minimum values of the correcting variable, or for the output signal of the exhaust gas sensor, are stored in at least one counter during a release condition.

2. The method of claim 1, further comprising evaluating a change over time of the correcting variable or of the output signal of the exhaust gas sensor for a certain time with regard to achieving very high or very low displacements of the correcting variable to diagnose an error of the exhaust gas sensor.

3. The method of claim 1, further comprising detecting a maximum value or a minimum value of the correction value or of the output signal of the exhaust gas sensor when an upper threshold is exceeded or a lower threshold value is fallen short of.

4. The method of claim 3, further comprising only counting the maximum values or the minimum values of the correcting value or of the output signal of the exhaust gas sensor if the values occur alternately.

5. The method of claim 3, further comprising detecting an erroneous exhaust gas sensor if the counter for the maximum values or the counter for the minimum values reach a certain threshold value before certain counter values are achieved in the counter for detecting time periods with a minimum length.

6. The method of claim 1, further comprising creating a product of the correcting variable and another variable that is derived by using a calculation operation from the output signal of the exhaust gas sensor, wherein a change over time of the product is evaluated with regard to exceeding certain threshold values.

7. The method of claim 6, further comprising using a filter function on the change over time of the product.

8. The method of claim 6, further comprising using a high-pass filter function on the correcting variable.

9. The method of claim 1, wherein the exhaust gas sensor is a two-point lambda probe or a wideband lambda probe, and wherein a change over time of a lambda value is evaluated as output signal.

10. The method of claim 1, wherein the exhaust gas sensor is a NOx-sensor, and wherein a change over time of a NOx-content in the exhaust gas of the combustion engine is evaluated as output signal.

11. The method of claim 1, further comprising, upon detection of an erroneous exhaust gas sensor, performing at least one of: signaling the error to an operator of the combustion engine; and registering the error in an error storage.

12. The method of claim 1, further comprising using a combustion engine with a multi-bank exhaust gas system, wherein exhaust gas of different cylinder groups is delivered in separated exhaust gas ducts, and wherein at least one exhaust gas sensor is built in each exhaust gas duct.

13. A device configured to implement a method of diagnosing an operation of an exhaust gas sensor that is arranged in an exhaust gas duct of a combustion engine, wherein the exhaust gas sensor controls through a control loop a parameter of a gas mixture that is supplied to the combustion engine, the method comprising: during a diagnosing period, using a displacement over time of a correcting variable for the parameter that is derived from an output signal of the exhaust gas sensor, or a course over time of the output signal of the exhaust gas sensor for the diagnosis; and determining an operational state of the exhaust gas sensor in an evaluation algorithm based on the output signal of the exhaust gas sensor; and upon implementation of the evaluation algorithm, at least one of detected time periods with a minimum length, detected amounts of maximum values, and detected amounts of minimum values of the correcting variable, or for the output signal of the exhaust gas sensor, are stored in at least one counter during a release condition.

* * * * *